US011304484B2

(12) United States Patent
Chen

(10) Patent No.: US 11,304,484 B2
(45) Date of Patent: *Apr. 19, 2022

(54) CLOSURE MECHANISM FOR JEWELRY

(71) Applicant: PAJ, Inc., Dallas, TX (US)

(72) Inventor: Felix Chen, Dallas, TX (US)

(73) Assignee: PAJ, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,204

(22) Filed: Feb. 18, 2020

(65) Prior Publication Data
US 2020/0311323 A1 Oct. 1, 2020

Related U.S. Application Data

(63) Continuation of application No. PCT/US2018/025381, filed on Mar. 30, 2018, which
(Continued)

(51) Int. Cl.
*A44C 13/00* (2006.01)
*A44C 15/00* (2006.01)
(Continued)

(52) U.S. Cl.
CPC .......... *A44C 5/2076* (2013.01); *A44C 5/2033* (2013.01); *A44C 15/005* (2013.01);
(Continued)

(58) Field of Classification Search
CPC ... A44C 5/2033; A44C 5/2057; A44C 5/2061; A44C 5/209; A44C 5/18; A44C 5/20; A44C 5/2019; A44C 13/00; A44C 17/0216; A44C 17/0225; A44C 3/008; F16B 2/10; F16B 45/02; F16B 45/06; A44D 2201/06; Y10T 24/3902; Y10T 24/45361; Y10T 24/44538; Y10T 24/4453
USPC ............ 63/3.1, 29.1, 40, 20, 43, 35, 33, 19; 70/2, 160, 159; 24/DIG. 46, DIG. 47, 24/DIG. 51, DIG. 43, DIG. 44, DIG. 45, 24/376, 483, 489, 505, 517, 518, 519, 24/520, 66.8, 66.13, 66.11, 66.1, 66.5,
(Continued)

(56) References Cited

U.S. PATENT DOCUMENTS 3,853,416 A * 12/1974 Hanan ................ A44C 17/0216
403/322.1
4,113,156 A 9/1978 Brito
(Continued)

FOREIGN PATENT DOCUMENTS

SU 1623595 1/1991

*Primary Examiner* — Jack W Lavinder
(74) *Attorney, Agent, or Firm* — Ostrolenk Faber LLP

(57) ABSTRACT

A jewelry closure mechanism (e.g., clasp) may include a locking receptacle and a locking pin that operate together to provide a closure mechanism for a piece of jewelry. The closure mechanism may or may not include a hinge. In some implementations, a locking pin may extend from the second arm and be inserted into a locking receptacle formed in a second arm to lock the two components together. The locking receptacle may include one or more wires (e.g., spring and/or precast) that extend transversely to the direction of the locking receptacle. The closure mechanism may be used as a general jewelry closure device and/or to couple segments of jewelry together.

16 Claims, 9 Drawing Sheets

Related U.S. Application Data is a continuation of application No. 15/680,394, filed on Aug. 18, 2017, now Pat. No. 10,154,709.

(51) Int. Cl.
| | |
|---|---|
| *A44C 5/20* | (2006.01) |
| *A44C 25/00* | (2006.01) |
| *G06F 30/20* | (2020.01) |
| *G06F 17/18* | (2006.01) |
| *G06Q 40/02* | (2012.01) |
| *G06Q 10/06* | (2012.01) |

(52) U.S. Cl.
CPC ............ *A44C 25/007* (2013.01); *G06F 17/18* (2013.01); *G06F 30/20* (2020.01); *G06Q 40/025* (2013.01); *A44C 5/2071* (2013.01); *A44C 25/001* (2013.01); *A44D 2200/10* (2013.01); *G06Q 10/067* (2013.01)

(58) Field of Classification Search
USPC ............ 24/49.1; 633/33; 27/574.1; 132/278, 132/279
See application file for complete search history.

(56) References Cited

U.S. PATENT DOCUMENTS

| | | | |
|---|---|---|---|
| 5,138,855 A | | 8/1992 | Faris |
| 5,577,396 A | | 11/1996 | Cannon |
| 6,296,412 B1 | * | 10/2001 | Bakker .................. B41J 13/076 403/1 |
| 2015/0027167 A1 | | 1/2015 | Huynh |

* cited by examiner

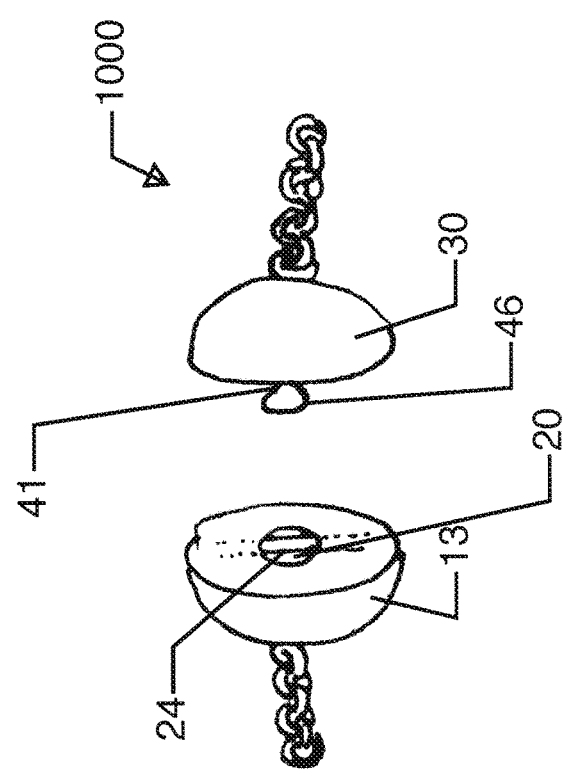

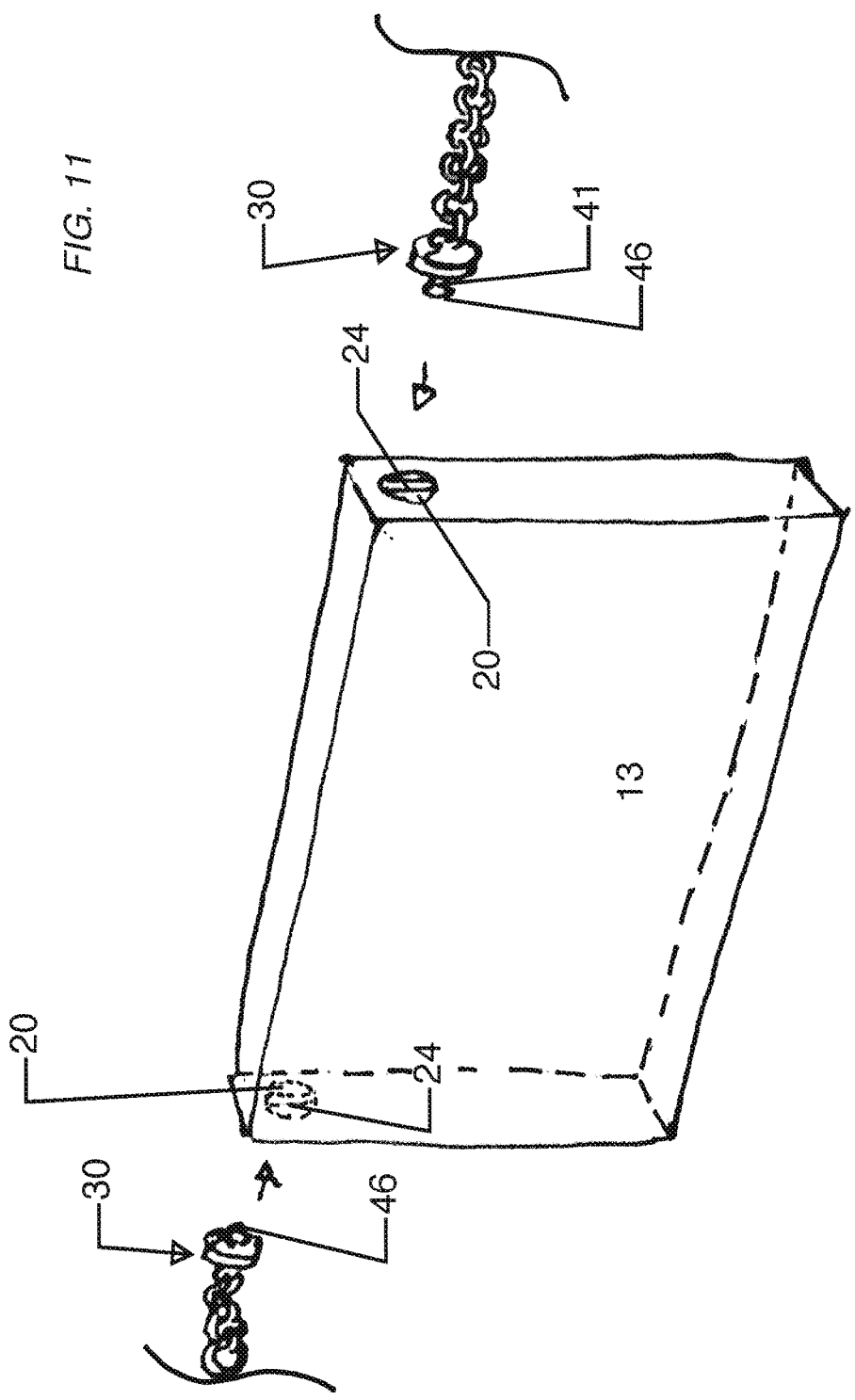

CLOSURE MECHANISM FOR JEWELRY

CROSS-REFERENCE TO RELATED APPLICATIONS

This application is a continuation in part of PCT International Application No. PCT/US18/25381 filed on Mar. 30, 2018, which claims the benefit of priority to U.S. patent application Ser. No. 15/680,394 filed on Aug. 18, 2017 and issued as U.S. Pat. No. 10,154,709, both of which are fully incorporated by reference for all purposes. This application also is related to U.S. patent application Ser. No. 16/036,564 filed on Jul. 16, 2018 and now issued as U.S. Pat. No. 10,493,575 and is a divisional of U.S. patent application Ser. No. 15/680,394 filed on Aug. 18, 2017 and issued as U.S. Pat. No. 10,154,709, both of which are fully incorporated by reference for all purposes.

TECHNICAL FIELD

The present invention relates to a closure mechanism for jewelry.

BACKGROUND

A function of a jewelry closure mechanisms, clasps and the like is not only to make initial contact between the ends of the necklace or to allow easier interchange of charms and necklaces and like functions, but also to ensure that during the lifetime use of the jewelry piece, the clasp/closing mechanism remains secure, easy to use and not prone to accidentally open, which can result in expensive jewelry becoming lost.

In the prior art, oftentimes jewelry closure pieces and clasps are made of gold material which is a comparatively softer material with less springiness and, in which, repeated use of the clasp and closure mechanism can result in its weakening and eventual loss of function.

SUMMARY

In various implementations, closure mechanisms for jewelry are described. A closure mechanism may be useable with necklaces, charms, bracelets, rings, earrings, wristbands, etc. The closure mechanism may provide a more secure closure mechanism (e.g., when compared with other commonly used jewelry closures such as standard post butterfly earring backs and toggles) and/or a single-step closure mechanism. The closure mechanism can be provided, for example, as a clasp mechanism.

In various implementations, the jewelry closure may be a single reliable closure mechanism that facilitates its use.

In various implementations, the jewelry closure may be ornamental and/or highly reliable and far less likely to lose its functionality with repeated use of the closure mechanism.

In various implementations, a jewelry closure device may include a first arm and a second arm capable of coupling via a locking mechanism. The locking mechanism may include a locking receptacle and a corresponding locking pin. The first arm may include a first side and a second opposing side. A locking receptacle of the first arm may include an opening that extends from the first side of the first arm at least partially through the first arm. The opening may include a cross-section, a depth, a first side proximate the first side of the first arm, and a second opposing side. The second opposing side may be closer to the second side of the first arm than the first side of the opening. A set of precast wires may be disposed across the cross-section of the opening in the first arm. A first area may be disposed between the set of precast wires and the first side of the opening, and a second area may be disposed between the set of precast wires and the second side of the opening. In some implementations, the first arm may include more than one locking receptacle. The second arm may be capable of coupling with the first arm and include one or more locking pins. A locking pin may include at least one pinhead disposed proximate an end of the locking pin. At least one wire of the set of precast wires may be configured to deflect when at least one of the pinheads of the locking pin is pushed at least partially through the opening of the locking receptacle to allow the locking pin to be disposed in the second area of the first arm such that the first arm and the second arm are coupled.

In various implementations, a jewelry clasp may include a lower arm and an upper arm, hingedly joined to each other at a first respective end thereof; a locking pin provided adjacent a second end of the upper arm, and extending toward a respective second end of the lower arm, the locking pin comprising at a distal end thereof a pin head; and a locking receptacle formed adjacent the second end of the lower arm, the locking receptacle containing therein at least one spring wire configured to resiliently deflect when the pin head of the locking pin is pushed into the locking receptacle, allowing the locking pin to move past the at least one spring wire so as to positively lock the second respective ends of the lower arm and the upper arm to each other. In some implementations, the at least one spring wire comprises first and second spring wires extending substantially parallel to each other in the locking receptacle and spaced apart at a distance less than a diametrical size associated with the pin head, and the pin head is spherically shaped.

In various implementations, a holding strip is attached at one end thereof to an underside of the upper arm and has a free distal end with a pin opening therein, and the locking pin passing through said pin opening, and the lower arm and the upper arm have respective, curved outer surfaces. A jewelry ornament, for example a jewelry charm, is attached to the locking pin, between the holding strip and the underside of the upper arm. In some implementations, each of the lower arm and the upper arm comprises a respective hinge and including a common hinge pin passing through and hingedly connecting the lower arm and the upper arm. An interior space is defined between the lower arm, the upper arm and the locking pin and for the passage there-through and for removably receiving a jewelry piece, for example jewelry charm, a jewelry necklace, a jewelry bracelet, a jewelry pendant and the like.

In some implementations, the locking pin is threadedly attached to the upper arm or the locking pin is attached to the upper arm via a pin cap.

In various implementations, a jewelry closure mechanism may include first and second arms, one of which contains the locking pin and the other of which contains the locking receptacle, without the arms being hinged to each other. Furthermore, the two retaining spring wires may be pre-cast into the body of the second arm, passing inside the locking receptacle. The closure device can be used with any of the aforementioned jewelry pieces including in rings and earrings and the like. In one implementation, the clasping structure can be used on top of a ring and presented as a jewelry locket, in which a lid is openable, exposing a pocket that can then be closed safely without opening.

The details of one or more implementations are set forth in the accompanying drawings and the description below.

Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 10 illustrates a side view of an implementation of an example of an example closure mechanism.

FIG. 11 illustrates a side view of an implementation of an example of an example closure mechanism.

Like reference symbols in the various drawings indicate like elements.

DETAILED DESCRIPTION

In various implementations, jewelry may include a closure mechanism. The closure mechanism may provide a secure closure between components and/or segments of the jewelry piece. The closure mechanism may increase user satisfaction with jewelry by providing an easy to use opening and closing of the clasp (e.g., closure mechanism) during use, by providing a closure mechanism that is easy to use by many ages (e.g., as compared with screw back earrings, lobster claw closures, s-hook closures, etc.), and/or by reducing loss (e.g., by providing a secure and/or long wearing closure mechanism). The closure mechanism may include a locking receptacle housed in a first arm and a locking pin capable of coupling with the locking receptacle.

Figure 1:
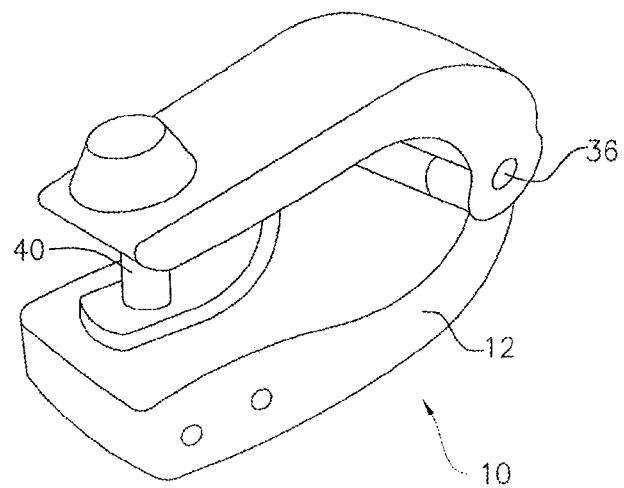
FIG. 1 is a perspective showing the jewelry closure mechanism of the present invention, formed as a clasp.
Figure 3A:
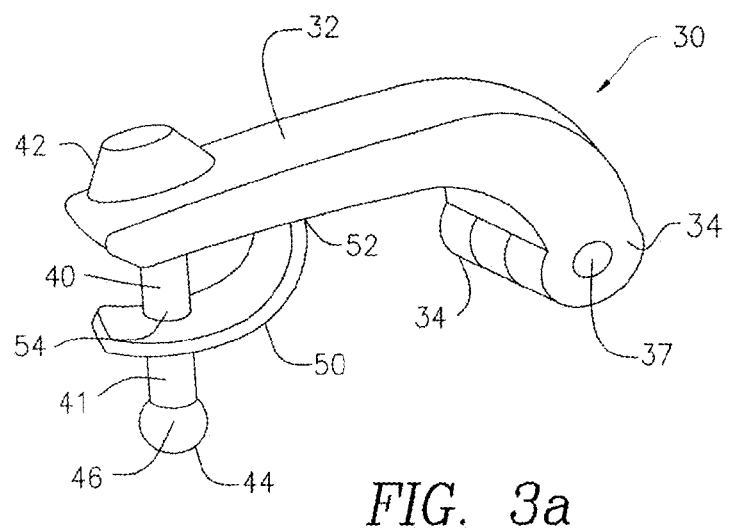
FIGS. 3a, 3b and 3c provide an exploded, disassembled and perspective depiction of the components of the jewelry clasp of FIG. 1.
Figure 3B:
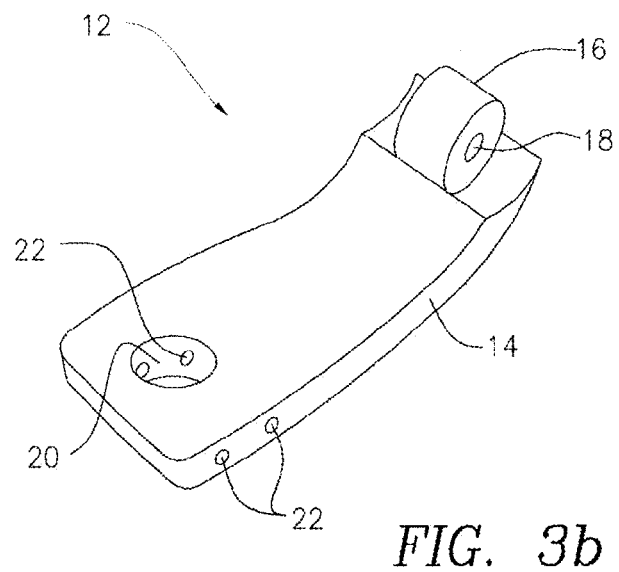

With initial reference to FIGS. 1, 3a and 3b, the primary components of the overall jewelry clasp 10 include a base arm 12, a swinging upper arm 30, both hingedly interconnected at one side thereof by a hinge 36. The opposed distal ends of the base arm 12 and the upper arm 30 are closeable by a locking mechanism 40.

Figure 5:
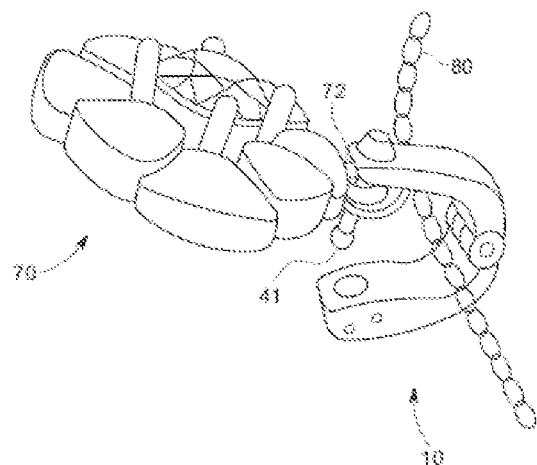
FIG. 5 is a perspective showing jewelry ornaments or pieces used with the clasp of the present invention.

A glance at FIG. 5 enables appreciating one mode of use of the jewelry clasp 10, in which a chain or a bracelet component 80 can be easily placed between the closeable arms of the jewelry clasp and locked therein. In addition, the jewelry clasp 10 can permanently (or removably) hold a jewelry charm 70 that has a ring 72 that is secured by the locking pin 41.

Figure 3C:
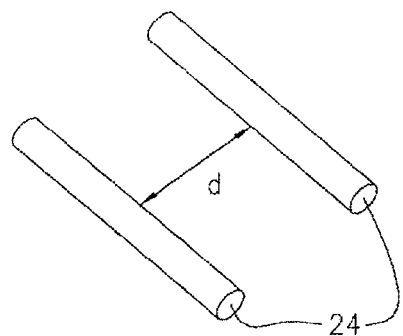

As illustrated in the disassembled drawings in FIGS. 3a, 3b and 3c, the base arm 12 comprises a body 14, curved on the outside toward the hinge 36 and provided with a cylindrically shaped hinge piece 16 with a bolt hole 18. A through-going opening 20 at the distal end of the base arm 12 is designed to receive the bulbous or spherical locking pin head 44 (of the upper arm 30) which pin head is sized to have a width-wise extending diameter 46 that just barely fits through the opening 20. The sidewise-penetrating orifices 22 are spaced relative to each other by a distance "d" (FIG. 3c), which distance is just slightly smaller than the diameter of the pin head 44. The orifices 22 receive a pair of pins or wires 24.

Figure 2:
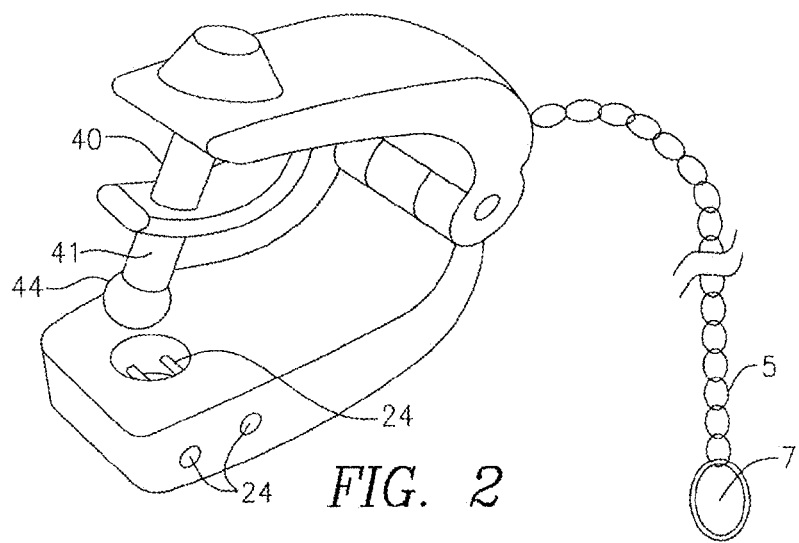
FIG. 2 is another perspective of the invention, showing the jewelry clasp in an opened position.

Turning to FIG. 3a, the upper clasp arm 30 has an outer curved surface 32, and at one distal end thereof the hinge components 34, both containing a through-going hinge orifices 37, and being spaced from each other by the thickness of the hinge component 16 of the base arm 12. When the hinge components of the upper and lower clasp arms are assembled and a pin 37 is passed there-through, these arms hingedly swing relatively to each other as illustrated in FIG. 2.

In FIG. 3a, at the openable end of the jewelry clasp, the pin 41 is passed through an opening 54 in the arcuate charm holder 50, which holder 50 is affixed to the bottom surface of the upper arm 30, at 52. The pin passes through another opening (not shown) in the upper arm and secured with a cap 42. The holding ring 72 of the charm 70 can be inserted into the space between the charm holder 50 and the upper arm 32 at the time that the pin 41 is attached, or at any time. For example, the pin opening (not shown) can be a threaded opening and the pin 41 might have a threaded end (opposite to its locking pin 44) so it can be threaded into the upper arm 32. In some implementations, cap 42 might contain the internal threads and the diameter of the opening might be slightly smaller than the diameter of the pin 41, to fix the position of the pin 41 relative to the upper arm 32.

In everyday use, the charm 72 might be permanently affixed to the locking pin 41 as shown in FIG. 5, and this assembly, consisting of the charm 70 and the jewelry clasp 10, can be attached to the chain 80 or to a bracelet or the like. In fact, in the case of a bracelet, many such charms can be hung on a wrist bracelet, a necklace and the like.

In some implementations, the wires 24 extending in the locking opening 20 have their ends immovably secured in the orifices 22 to prevent their sliding inside the orifices and are made of material different than gold, for example stainless wire, that has the strength and resiliency (even at very low wire thicknesses) to withstand the repeated flexing during closing (and opening) of the clasp. Similarly, the locking pin 41 can similarly be made from material other than gold to assure that the bulbous locking pin 44 will not wear down over many years of use. These components do not normally come in contact with the human skin and therefore do not present issues of skin sensitiveness and the like.

The jewelry locking clasp described above can also be used as an earring piece, in which case the locking pin 41 would likely be made of gold, while the wires 24 can be still made of stainless steel, without causing any discomfort or rashes in people having very sensitive ears, etc.

As illustrated in FIG. 2, when the clasp 10 is used as a general purpose closure device, a chain or necklace 5 has one end thereof attached to one of the two arms while an opposite end of the chain 5 has a ring 7 with an opening large enough so that it can be placed over the locking receptacle with the bulb 44 passing through the ring 7 and allowing the bracelet or necklace 5 or the like to be worn around ones wrist or as a necklace that is worn around one's neck.

While the invention has been described relative to the resilient pins 24 extending into the locking receptacle by being inserted through orifices 22, in fact, the wires 24 may be placed into a (lost wax) mold, in such a way that the wires 24 are precast together with the material of the lower arm 12 so that they are permanently in place and do not require special assembly, which saves on cost and may contribute to improving the overall aesthetics of the closure device.

Figure 4:
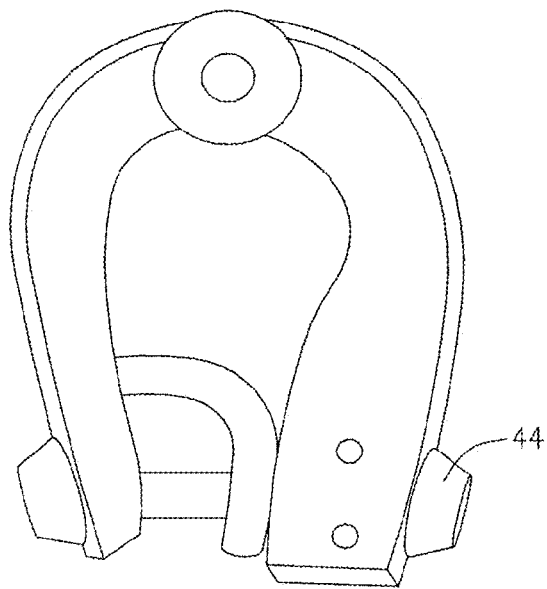
FIG. 4 provides a side-view of the jewelry clasp of FIG. 1.

As can be appreciated from the side view of FIG. 4, the jewelry clasp 10 is dimensioned in such a way that merely pressing together the two arms 12, 30 will cause the locking pin 41 to pass through the locking opening 20, snap closing behind the retaining wires 24, without any looseness as the distal end of the charm holder 50 provides a counterforce in the opening direction. The clasp 10 is easily openable by merely pressing on the locking head 44, which will cause the overall pin 41 to snap open, once the locking bulb 44 has passed the halfway point between the wires 24.

The clasp mechanism concept of the present invention utilizes a single closure, with little risk of this clasp opening accidentally, owing to the very strong positive locking force exerted by the wires 24, which disposes of the need for a double closure mechanism, e.g. a safety bar or the like being swung around the main closing mechanism.

Figure 6:
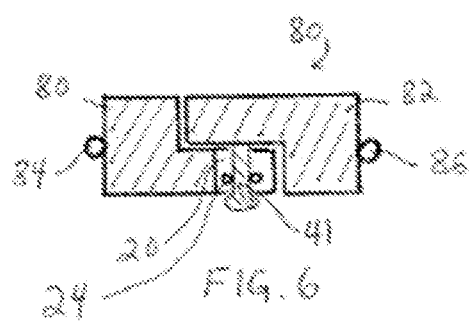
FIG. 6 is a diagrammatic depiction of the basic concept of the invention, formed as a general purpose closure piece for jewelry.

With reference to FIG. 6, when used as a general jewelry closure device 80, the invention can be described as consisting of first and second arms 80,82 where the piece 82 carries the aforementioned locking pin 41 and the other arm 80 has the locking receptacle 20 which supports the spring wires 24, as previously described. The overall closure device 80 can be made in extremely small, millimeter sized dimensions. The arms 80,82 have respective attachment rings 84,86. As previously noted, the spring wires can be fabricated of steel wire 0.5 mm in diameter and even at smaller diameters, for example 0.25 mm steel wire. Any other hard, high-temperature resistant metal, such as titanium, palladium, platinum and the like may be used.

Figure 7A:
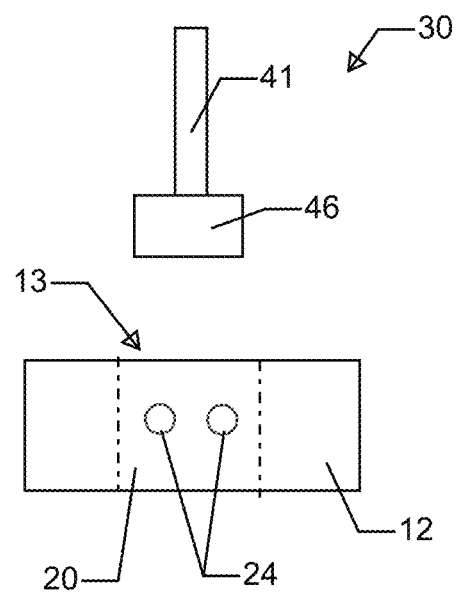
FIG. 7A illustrates an implementation of an example uncoupled closure mechanism.
Figure 7B:
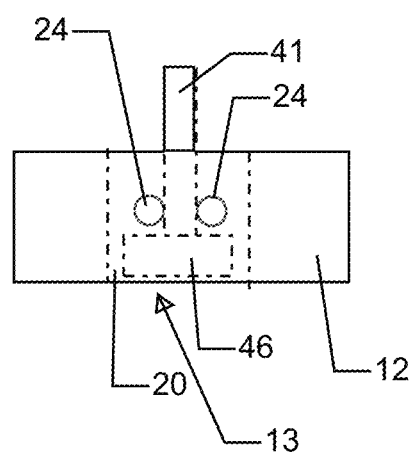
FIG. 7B illustrates an implementation of an example coupled closure mechanism.
Figure 7C:
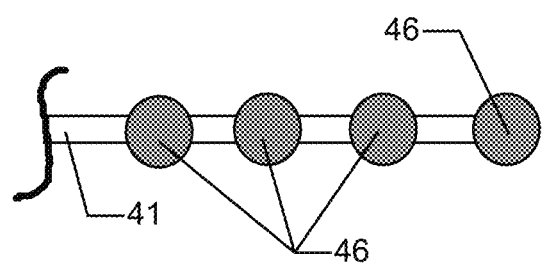
FIG. 7C illustrates an implementation of an example locking pin.

Although FIGS. 1-6 illustrate specific implementations of the jewelry in example jewelry pieces, the closure may be used with any appropriate jewelry pieces. Furthermore, the shape of the closure and/or portions thereof may be similar or different to the closures illustrated. FIGS. 7A and 7B illustrate an implementation of an example, closure mechanism for an example, piece of jewelry (e.g., necklace, bracelet, earring, brooch, etc.). The piece of jewelry may reside primarily on the first arm, the second arm and/or on be coupled to both arms of the closure mechanism. FIG. 7A illustrates an implementation of an example uncoupled closure mechanism and FIG. 7B illustrates an implementation of an example coupled closure mechanism. The closure mechanism may include a first arm 12 with a locking receptacle 13 and a second arm 30 with a locking pin 41. The locking pin 41 may be received by and couple with the locking receptacle to close (e.g., couple the parts of) the closure mechanism (e.g., clasp of a necklace, clasp of a bracelet, parts of an earring, joinder between segments, etc.). As illustrated, the first arm 12 and the second arm 30 of the closure mechanism may not include a hinge that couples the arms together (e.g., as contrasted to the implementation illustrated in FIG. 1).

The arms 12, 30 may include a locking pin 41 and a locking receptacle 13. Although the locking receptacle 13 is illustrated disposed on the first arm 12, the locking receptacle may reside on the second arm 30. Although the locking pin 41 is illustrated as disposed on the second arm 30, the locking pin may be disposed on the first arm 13. As illustrated, the arms 12, 30 may be coupled via opening 20 of the first arm 12 and the locking pin 41 of the second arm 30. The first arm 12 may include a locking receptacle 13. The locking receptacle may include an opening 20 disposed at least partially through the first arm 12. The size and/or shape of the first arm may vary (e.g., based on the jewelry piece in which the closure mechanism is used). The shape of the opening 20 at least partially through the first arm may be approximately cylindrical as shown and/or any other appropriate regular or irregular shape. In the opening may reside at least a portion of at least two wires 24. The wires may be pre-cast to inhibit displacement of the wires from the wire openings, in the first arm in which the wires 24 are disposed, due to wear, use, age, etc. The wires may extend from a first side (shown) to an opposing side (not shown). As illustrated, the second arm 30 may include a locking pin 41. The locking pin 41 may include at least one pinhead 46 to inhibit removal of the locking pin from the locking receptacle when the closure mechanism is closed (e.g., until the closure mechanism is opened).

The locking pin 41 may include more than one pinhead 46 (e.g., disposed along a length of a locking pin). For example, the wires may reside between two adjacent pinheads when the closure mechanism is closed. In some implementations the use or multiple pinheads along a length of a pin (e.g., see FIG. 7A) may allow adjustment of the length of the jewelry piece (e.g., necklace may be made shorter or longer depending on the number of pinheads allowed to pass through the wires of the locking receptacle; the distance between an earring front and back may be shortened or lengthened based on which pinheads are disposed through the opening, etc.). In some implementations, one or more of the pinheads may operate similarly to a holding strap. A jewelry ornament may be coupled to the locking pin between and end of the locking pin and a pin head and/or between adjacent pinheads. The size of the pinhead (e.g., relative to the opening of the jewelry ornament clasp opening size) may inhibit release of the jewelry ornament from the pin. For example, a jewelry ornament may be disposed between a first pinhead and a second pinhead while a third pinhead (adjacent to the second pinhead and/or other pinheads disposed along a length of the pin) may operate with the locking receptacle to close the closure mechanism.

In some implementations, the pinhead may be disposed at an end of the second arm 30, proximate an end of the second arm and/or at a distance from an end of the second arm. The shape of the locking pin may be the same along a length of the pin. The shape of the locking pin may be cylindrical as shown and/or any other appropriate shape. The shape of pin head may be the same along a length of the pin head. The shape of the locking pin may be rectangular as shown, spherical (as shown in FIG. 1), and/or any other appropriate shape. During coupling of the first arm and the second arm of the closure mechanism, the pinhead 46 may at least partially deflect one or more of the wires 24 such that the pinhead passes through the distance, d, between the wires into the opening. The pinhead may reside at least partially in the opening 20 of the first arm 12 and/or at least partially outside the opening 20 of the first arm. The wires 24 may or may not contact at least a portion of the locking pin while the closure mechanism is closed or coupled.

Figure 8B:
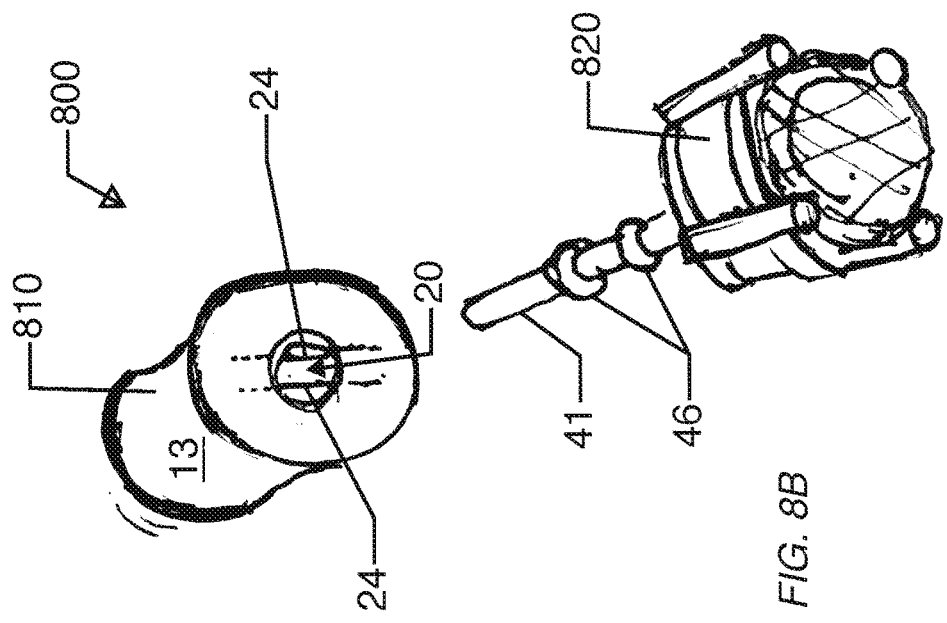
FIG. 8B illustrates front perspective view of an implementation of an example of an earring illustrated in FIG. 8A.
Figure 8A:
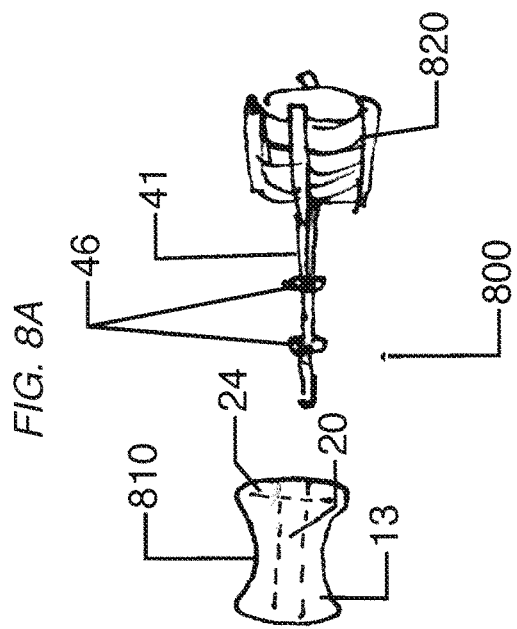
FIG. 8A illustrates a side view of an implementation of an example of an earring with an example closure mechanism.

In various implementations, although the first arm and the second arm are illustrated as single segments, they may be single pieces or include multiple segments. For example, the first arm and/or second arm may include portions of an earring (e.g., front and/or back of earring). The back of the earring may be approximately cylindrical as illustrated and/or may reside within conventional earring backs such as butterfly backs. As another example, the second arm may extend from the back surface of an earring front (e.g., stud, decorative image, hoop, etc.). FIGS. 8A and 8B illustrate an implementation of a closure mechanism in an earring 800. The earring may include an earring back 810 and an earring front 820. The earring front and/or earring back may be decorative. The earring front may be disposed proximate and/or contact an anterior surface of a wearer's ear. An earring back may be disposed proximate and/or contact a posterior surface of a wearer's ear. As illustrated, the earring back 810 and the earring front 820 may be coupled together via the described closure mechanism. The earring back 810 (e.g., a first arm 13) may include an opening 20 disposed at least partially through the earring back. As illustrated, the opening 20 extends from a first side (e.g., side contacting a posterior side of an ear during use) of the earring back through the earring back. A set of wires 24 may be disposed across the opening (e.g., laterally across the opening, across a cross-section of the opening). The wires 24 may be pre-cast (e.g., placed in wax during a lost-wax production process). The earring front may include a locking pin 41 extending from a body of the earring front 820. The locking pin 41 may include one or more pinheads 46. The pinheads may be disk shaped, in some implementations as illustrated, and/or any other appropriate shape. The use of more than one pinhead may provide a more secure fit and/or inhibit drooping of earrings (e.g., due to weight, shape, size, etc. of earring front) since a user may select which pinhead(s) to dispose behind the wires (e.g., in an area of the opening disposed behind the wires). Although a stud style earring is illustrated, the earring front may be any appropriate type of earring. In some implementations, although a cylindrical earring back is illustrated, a larger earring back may be utilized. For example, the locking mechanism (e.g., opening and wires) may be disposed in a disk. The disk may contact a greater surface of the posterior of the ear to inhibit earring drooping and/or looseness. As another nonlimiting example, the locking mechanism may be disposed in a butterfly style earring back.

Figure 9:
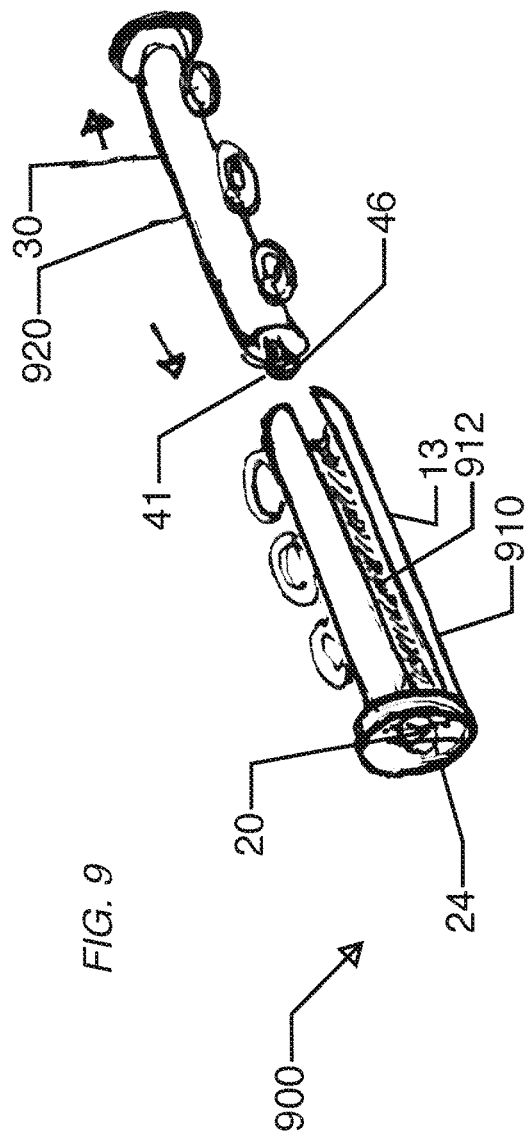
FIG. 9 illustrates a side view of an implementation of an example of an example closure mechanism.

In some implementations, the first and second arm lock such that at least a portion of one of the arms resides in the lumen of another. FIG. 9 illustrates an implementation of a closure mechanism 900 in interlocking segments of a piece of jewelry. As illustrated, a first segment 910 (e.g., first arm 13) has a lumen 912 in which at least a portion of a second segment 920 (e.g., second arm 300 can reside. The locking mechanism (e.g., opening 20 and wires 24) resides in an end of the first segment 910, 13. The second segment 920, 30 is inserted into the lumen 912 of the first segment 910 until the pinhead 46 of the locking pin 41 engages the wires 24, as previously described. The first segment may have a recess that allows access to portions of the second segment such as loops and/or other features. The loops may be utilized for any purpose such as charms, lengths of chain, etc.

In some implementations, a bracelet may include a similar locking mechanism in which a first end of a bracelet (e.g., a second arm) may be inserted into a second end of a bracelet with a locking mechanism. The first end may be inserted until it engages with the wire(s) of the locking mechanism to close the bracelet. To open the bracelet, the first end may be pulled with a force great enough to deflect the wires and pull the pinhead through the set of wires and release the first end of the bracelet.

FIG. 10 illustrates a portion 1000 of jewelry with a closure mechanism of in which the locking pin may reside at the end of a length of jewelry (e.g., necklace, bracelet, belt, etc.). The first arm and the second arm may include complementary shapes, as illustrated, or may not in other implementations. The first arm 13 may include a locking mechanism with an opening 20 disposed partially through the first arm. A set of wires (e.g., precast) may be disposed across the opening, as illustrated. The second arm 30 may include a locking pin with a pinhead. As illustrated the locking pin and pinhead may be combined such that a short distance resides between the pinhead and the remainder of the second arm. The short distance may ensure a tight and/or seamless fit between the first and the second arm. The pinhead 46 of the second arm 30 may be inserted between the wires 24 (e.g., temporarily deflecting the wires to pass to the area disposed behind the wires) to lock the first and second arm together. The wires may return to an initial position (e.g., resting position) to secure the pinhead behind the wires and securely lock the first and second arms together.

In some implementations, a first arm 13 may include more than one locking receptacles. The use of more than one locking mechanism may allow adjustments in length and/or style (e.g., user may select which locking mechanism to insert a locking pin based on preference), connection with a decorative first arm, and/or connection of a series of segments. For example, first arm 13 may be a decorative portion of a piece of jewelry, such as a pendant, locket, etc. As another example, first arm 13 may be connecting segment between other segments of a piece of jewelry (e.g., a tube or other conduit that connects with other segments of a necklace), etc. FIG. 11 illustrates an implementation of a portion 1100 of a piece of jewelry that includes a closure mechanism with multiple locking receptacles. As illustrated, the first arm 13 includes a locking receptacle proximate two opposing ends. In some implementations, the locking receptacle may be disposed on adjacent ends, on more than two ends, serially along a length, and/or any other appropriate arrangement. The locking receptacles include an opening 20 and a set of wires 24 that are disposed across the opening 20. One or more of the wires 24 may be precast and configures to deflect temporarily when a pinhead 46 of a locking pin 41 is inserted through the opening (e.g., the wire(s) may return to an initial position once a pin head is disposed in the area of the opening behind the wires). As illustrated, second arms 30 may be coupled to other portions of the jewelry, such as the illustrated chains. The locking pins 41 of the second arms may be disposed at an end such that when the pinhead 46 of the locking pin 41 is inserted into the opening of the locking receptacle, the other portions of the jewelry (e.g., the chains) may be disposed outside the opening of the locking receptacle.

In various implementations, the closure mechanism may be opened and closed repeatedly. The use of precast wires may inhibit premature wearing (e.g., excessive wearing of the closure prior to the end of the lifetime of the jewelry item) since precast wires may be substantially stronger than wires inserted and adhered with solder and/or adhesive into finished jewelry. In some implementations, user satisfaction may be increased with precast wires due to aesthetics and/or function (e.g., precast wires may not loosen as quickly as adhered wires, ends of precast wires may not catch on clothing, etc.).

During closing of the closure mechanism, the pinhead of the locking pin (e.g., coupled to and/or forming the second arm) is inserted into the opening of the locking receptacle in the second arm. The pinhead may temporarily deflect at least one of the wires that is disposed across the opening to pass to an area behind the wire(s) (e.g., in the opening and/or outside the opening). The deflection of the wire(s) may create an opening large enough for the pinhead to pass. The wire may return to an initial position once the pinhead is disposed in the area behind the wires. This operation may be repeated to allow additional pinheads to pass into and/or through the opening. The return of the wire(s) to initial position may securely couple the first arm and the second arm and any associated jewelry components.

To open a closure mechanism, a pulling force may be applied to the locking pin. The force may be transferred pinhead, which exerts a force on at least one of the wires to deflect the wire(s). The deflection of the wire(s) may create an opening large enough for the pinhead to pass and exit the opening of the locking receptacle. This operation may be repeated to allow additional pinheads to pass out of the opening. Once the pinhead most proximate the end of the second arm is released from the wires, the closure mechanism is opened, and the first arm and the second arm may be separated.

In some implementations, a locking receptacle of a closure mechanism for jewelry produced at least partially using a lost wax process or operations thereof. While lost wax casting is itself known, the production of the described precast wire locking receptacles is not. During a lost wax casting process, the wires may be disposed in the wax model such that the wires are set in place when the metal locking receptacle is formed. Jewelry and/or portions thereof such as a locking mechanism may be produced at least partially through lost wax casting. For example, a wax mold is created and the set of wires are disposed transversely across the opening, which will correspond to the opening of the locking receptacle, in the wax mold. In some implementations, additional wax is added to couple the wires to the wax mold. Thus, when the wax is melted out and replaced by a metal in a lost wax casting process, the wires (e.g., steel wires) are set in the metal. As a nonlimiting example, a model may be generated of a locking receptacle (e.g., including or not including other portions of an item of jewelry). A mold may be created from the model of the locking receptacle. A wax model of the locking receptacle may be produced from the mold (e.g., by pouring melted wax into the mold, chasing a wax copy, spruing, etc.). The wax model may include at least a portion of a first arm of a closure mechanism, which includes the opening in which the wires may reside. A set of metal wires may be inserted into the opening in the wax mold such that each of these wires is disposed across the cross-section of the opening. In some implementations, additional wax may be utilized to couple the wire(s) into the wax mold. This wax mold with the inserted set of metal wires is then used to create a metal locking receptacle in which the set of wires are precast into a corresponding opening of the metal locking receptacle (e.g., a shell may be created, the wax mold may be melted allowing the metal wires to remain in the shell in an opening of the shell that will correspond with the opening in the locking receptacle; metal may be poured into the shell and then released).

The closure mechanism (e.g., the closure mechanism described in FIGS. 1-11) may be utilized in various pieces of jewelry, such as necklaces, bracelets, rings, earrings, etc.

Although various jewelry pieces have been described such as necklaces and earrings, the closure mechanism may be utilized to couple components of any appropriate type of jewelry. For example, a necklace may include a plurality of segments (e.g., similar and/or different in appearance) and two or more of the segments of the necklace may be joined using one or more of the described closure mechanisms. As another example, an earring may include a closure, where a first part from a set of interchangeable first parts and a universal second part couple to form an earring and its corresponding back.

The described process(es) may be implemented in various jewelry pieces, such as but not limited to the jewelry pieces described. In addition, various operations may be added, deleted, and/or modified. In some implementations, described process(es) may be performed in combination with other described or commonly known processes or operations thereof. For example, lost wax casting may include steps commonly known to a person of ordinary skill in the art and not described herein (e.g., the temperatures of heating processes, types of waxes and mold materials used, etc.). As another example, while lost wax casting is described, other similar pre-casting processes may be utilized to precast the wires in the jewelry closure.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a jewelry piece" includes a combination of two or more jewelry pieces and reference to "a wire" includes different types and/or combinations of wires.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A jewelry closure device, comprising:
a first arm, wherein the first arm comprises:
  a first side;
  a second opposing side;
  a locking receptacle, wherein the locking receptacle comprises:
    an opening that extends from the first side of the first arm at least partially through the first arm, wherein the opening comprises:
      a cross-section;
      a depth;
      a first side proximate the first side of the first arm;

a second opposing side, wherein the second opposing side is closer to the second side of the first arm than the first side of the opening;

a set of precast wires, wherein each of the precast wires is disposed across the cross-section of the opening in the first arm;

a first area disposed between the set of precast wires and the first side of the opening; and a second area disposed between the set of precast wires and the second side of the opening;

and a second arm capable of coupling with the first arm, wherein the second arm comprises a locking pin, and wherein the locking pin comprises at least one pinhead disposed proximate an end of the locking pin; and wherein at least one wire of the set of precast wires is configured to deflect when at least one of the pinheads of the locking pin is pushed at least partially through the opening of the locking receptacle to allow the locking pin to be disposed in the second area of the first arm such that the first arm and the second arm are coupled.

2. The jewelry closure of claim 1 wherein two or more wires of the set of precast wires are approximately parallel to each other in opening of the locking receptacle.

3. The jewelry closure of claim 1 wherein two or more wires of the set of precast wires are disposed at a distance less than a cross-sectional size of at least one of the pinheads of the locking pin.

4. The jewelry closure of claim 1 wherein the jewelry closure device comprises a clasp of a necklace or bracelet.

5. The jewelry closure of claim 1 wherein the first arm comprises an earring back and wherein the second arm comprises an earring front.

6. The jewelry closure of claim 1 wherein the first arm includes one or more additional locking mechanisms disposed in the first arm such that one or more additional locking pins may be coupled to the first arm.

7. The jewelry closure of claim 1 wherein the locking pin comprises a plurality of pin heads along a length of the locking pin to allow the length of a jewelry piece closeable via the jewelry closure to be adjusted.

8. The jewelry closure of claim 1, further comprising a holding strip, wherein a first end of the holding strap is coupled to an underside of the second arm, and wherein the locking pin passes through the holding strap, and wherein a gap resides between the holding strap and the underside of the first arm.

9. The jewelry closure of claim 1, further comprising a jewelry ornament attached to the locking pin.

10. The jewelry closure of claim 1, wherein the locking pin is at least one of threadedly attached to the second arm or attached to the second arm via a pin cap.

11. The jewelry closure of claim 1, wherein one or more wires of the set of precast wires has a diameter size equal to or smaller than approximately 0.5 mm.

12. The jewelry closure of claim 1, wherein one or more of the wires of the set of precast wires has a diameter size of approximately 0.25 mm to approximately 0.5 mm.

13. An article of jewelry comprising:
a first part comprising a first arm, wherein the first arm comprises:
a first side;
a second opposing side;
a locking receptacle, wherein the locking receptacle comprises:
an opening that extends from the first side of the first arm at least partially through the first arm, wherein the opening comprises:
a cross-section;
a depth;
a first side proximate the first side of the first arm;
a second opposing side, wherein the second opposing side is closer to the second side of the first arm than the first side of the opening;
a set of precast wires, wherein each of the precast wires is disposed across the cross-section of the opening in the first arm;
a first area disposed between the set of precast wires and the first side of the opening; and
a second area disposed between the set of precast wires and the second side of the opening;
a second part comprising a second arm capable of coupling with the first arm, wherein the second arm comprises a locking pin, and wherein the locking pin comprises at least one pinhead disposed proximate an end of the locking pin; and
wherein at least one wire of the set of precast wires is configured to deflect when at least one of the pinheads of the locking pin is pushed at least partially through the opening of the locking receptacle to allow the locking pin to be disposed in the second area of the first arm such that the first arm and the second arm are coupled and such that the first part of the jewelry piece and the second part of the jewelry piece are coupled.

14. The article of jewelry of claim 13 wherein the article of jewelry comprises a necklace or a bracelet, and wherein the first part of the article of jewelry comprises:
a first end, wherein the first end comprises the first arm; and
a second opposing end;
and wherein the second part of the article of jewelry comprises:
a first end coupled to the second end of the first part of the article of jewelry; and
a second opposing end comprising second arm.

15. The article of jewelry of claim 13 wherein the first part comprises a first segment of the article of jewelry and the second part comprises a second segment of the article of jewelry.

16. The article of jewelry of claim 13 further comprising one or more additional segments coupled to at least one of the first segment, the second segment, or at least one of the additional segments.

* * * * *